Jan. 17, 1967  G. M. STEIN  3,299,385
INTERLEAVED WINDINGS FOR ELECTRICAL INDUCTIVE APPARATUS
Filed March 13, 1964   10 Sheets-Sheet 3

Jan. 17, 1967  G. M. STEIN  3,299,385
INTERLEAVED WINDINGS FOR ELECTRICAL INDUCTIVE APPARATUS
Filed March 13, 1964  10 Sheets-Sheet 4

Jan. 17, 1967  G. M. STEIN  3,299,385
INTERLEAVED WINDINGS FOR ELECTRICAL INDUCTIVE APPARATUS
Filed March 13, 1964  10 Sheets-Sheet 5

Jan. 17, 1967  G. M. STEIN  3,299,385
INTERLEAVED WINDINGS FOR ELECTRICAL INDUCTIVE APPARATUS
Filed March 13, 1964  10 Sheets-Sheet 9

United States Patent Office 3,299,385
Patented Jan. 17, 1967

3,299,385
INTERLEAVED WINDINGS FOR ELECTRICAL
INDUCTIVE APPARATUS
Gerhard M. Stein, Sharon, Pa., assignor to Westinghouse
Electric Corporation, Pittsburgh, Pa., a corporation of
Pennsylvania
Filed Mar. 13, 1964, Ser. No. 351,674
4 Claims. (Cl. 336—187)

This invention relates in general to interleaved windings for electrical inductive apparatus, such as core form transformers, and more particularly to interleaved windings adapted to carry high currents.

It is well known that if the series capacitance of an inductive winding can be increased as compared to the ground capacitance the initial voltage distribution across the winding will be more nearly linear and there will be less tendency for surge voltages to concentrate in the line turns of the winding or to oscillate in the rest of the winding. As the KVA ratings of transformers are increased, it becomes necessary to increase the current carrying ability of the transformer windings. One method of doing this is to increase the number of conductors in parallel through each winding. It is a major problem to achieve both the high series capacitance and the high current carrying ability without increasing both the bulk and complexity of the winding.

Accordingly, it is a general object of this invention to provide a new and improved interleaved winding for electrical inductive apparatus.

It is a more particular object of this invention to provide a new and improved interleaved winding which has a minimum of interconnections.

It is yet another object of this invention to provide multiple conductor interleaved windings which have the same distribution factor as corresponding single conductor interleaved windings.

A further object of my invention is to provide a winding for electrical inductive apparatus which provides both continuous and interleaved current paths in each winding element.

Briefly, the present invention accomplishes the above cited objects by constructing a hollow or open center winding with a plurality of coil elements or sections such as pancakes or layers. The pancakes (also referred to as disks) are coaxially stacked open center elements. Each pancake, layer or disk is wound with several electrically insulated strands or conductors placed one on top of another and wound into a spiral. The pancakes or sections, which are also referred to in the art as coils, are then interconnected in such a manner that a minimum of interconnections are placed in the channels between pancakes. Most interconnections between pancakes are made on either the inside or outside surfaces of the hollow winding. A first group of circuits and a parallel second group of circuits are formed through the winding by the interconnections between pancakes. It will be understood that each group of circuits may include a single strand in each pancake or a plurality of strands. These parallel paths or circuits thus formed may be transposed from one pancake to another to reduce circulating current losses due to the axial component of leakage flux. Connections between pancakes at the inside of the winding may be kept from crossing intermediate pancakes. The interconnections between pancakes are made so as to uniformly stress the electrical insulation between adjacent conductor turns in each pancake. The circuits spiral alternately radially inward and radially outward from pancake to pancake. The capacitances between adjacent turns of the parallel circuits are effectively in parallel making for a high overall series capacitance winding.

Further objects and advantages of the invention will become apparent as the following description proceeds and features of novelty which characterize the invention will be pointed out in particularity in the claims annexed to and forming a part of the specification.

For a better understanding of the invention, reference may be had to the accompanying drawings, in which.

Figure 1A:
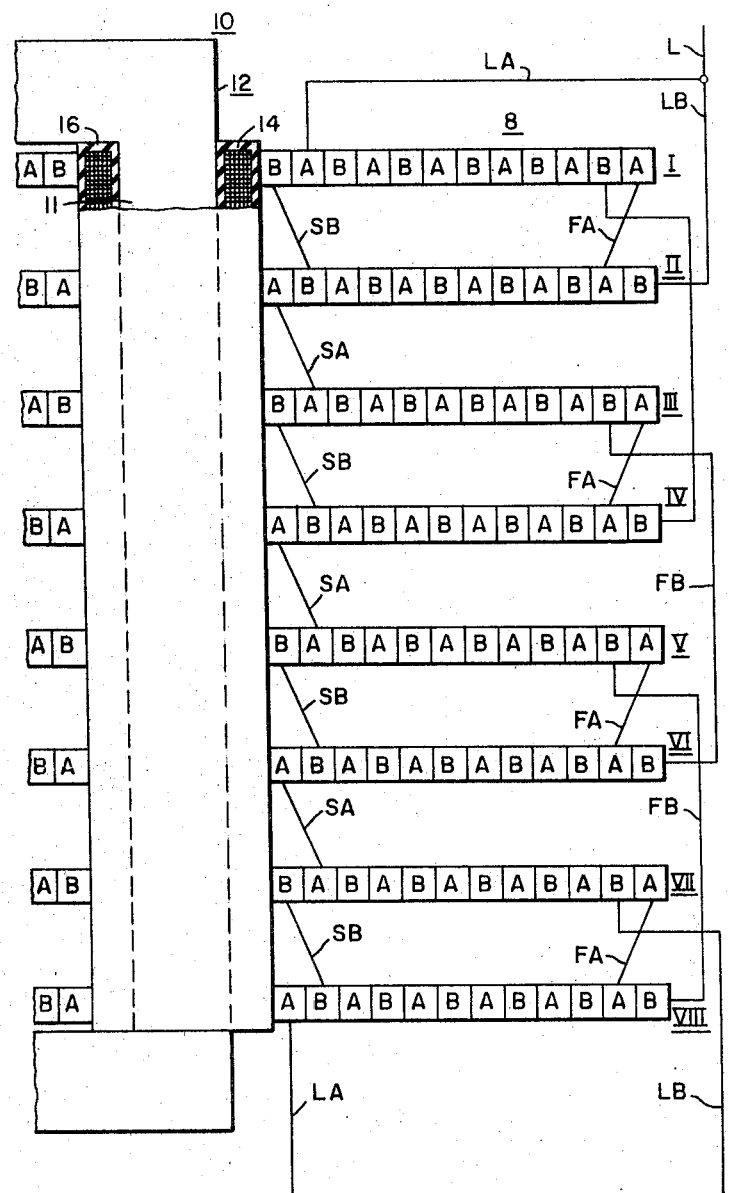
FIGURE 1A shows a partial transverse sectional view of the core and windings of a transformer embodying the teachings of the invention.
Figure 1B:
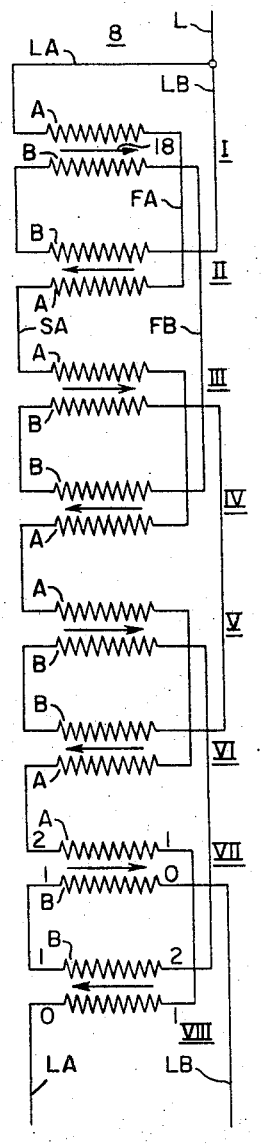
FIG. 1B is a schematic diagram of the embodiment of the invention illustrated in FIG. 1A.

Referring to the drawings and in particular to FIGS. 1A and 1B there is illustrated a portion of a core type transformer 10, partly in elevation and partly in transverse sectional view. It will be understood that in all embodiments of the invention like reference characters will refer to like parts. The transformer is a so-called core form type having a magnetic core 12 about a leg 11 of which is placed a low voltage winding 14. The low voltage winding 14 is covered with electrical insulation 16 to insulate the low voltage winding 14 from the magnetic core 12 and also from a high voltage winding 8. For purposes of illustration, the high voltage winding 8 is illustrated by eight sections or pancakes I–VIII. It will be understood that these roman numerals also refer to the schematic diagram of the pancakes illustrated in FIG. 1B. Each of the pancakes is wound with two electrically insulated strands which are designated throughout the figure as the A strand and the B strand. Each pancake is essentially a disk with a large hole in the center to accommodate the magnetic core 12 and the low voltage winding 14. The direction the strands spiral through the winding elements or pancakes is alternated from pancake to pancake. This is standard practice in transformed design. For purposes of simplicity, only the right half of the high voltage winding 8 has been illustrated in full; it will be understood that the broken away left half of the winding is symmetrical to and identical with the fully illustrated right half of the high voltage winding 8. The axis of symmetry of the high voltage winding 8 is through the vertical leg 11 of the magnetic core 12. It will be observed in each of the pancakes that the A circuit and the B circuit alternate from turn to turn. The pancakes are connected by start connections SA and SB and finish connections FA and FB. The term start connection is well known in the art and is so designated because when the A and B strands are wound into a pancake one practice is to use a revolving mandrel (not shown) starting the pancake next to the mandrel and then feeding the strands to the rotating mandrel until the pancake coil reaches the desired radial buildup. The finish connections are so-called because they are made at the outermost portion of the pancakes after the winding up of the pancake on the rotating mandrel is finished. The SB connections are start connections made between pancakes in the B circuit. The SA connections are start connections made from pancake to pancake with the A circuit. Because these connections go between a point at or near the start of one pancake to a point at or near the start of a second pancake, they are also sometimes referred to in the art as start-start connections. The FA connections are finish connections of the A circuit; the FB connections are finish connections of the B circuit. The finish connections go from a point at or near the finish of one pancake to a point at or near the finish of a second pancake hence these connections are also sometimes referred to as finish-finish connections. The line connections throughout the drawings will be referred to as LA for an A circuit line connection and LB for a B circuit line connection. Where the line connections are joined together to form a single line conductor this conductor is designated the L conductor. Because two paths are presented through the winding, high currents may be carried by the winding. It will be noted that all connections between pancakes are made either at the start or finish of the pancakes; no connections are used which start and finish in the same pancake. All connections are made either at the inside surface or the outside surface of the winding. The inside surface of the winding is at or near the low voltage winding 14; the outer surface of the winding are those turns at or near the outer radial extremities of the pancakes. None of the connections between pancakes traverse the space between pancakes in a radial direction; this simplifies the winding, reduces it cost, decreases leakage inductance, and enables the pancakes to be placed closer together axially making a more compact winding.

The B circuit enters the winding at the outside or finish of pancake II. The A circuit enters the winding close to the inside or start of pancake I. The B circuit leaves the winding close to the finish of pancake 7; the A circuit leaves the winding at the start of pancake 8. It will be understood that the relative size of the individual turns of the pancakes is exaggerated for clarity; as a practical matter, the number of turns in a pancake is so great in the radial buildup of the pancake that one may consider the first few inner turns to be at the inside surface of the winding and the last few outer turns in the radial build-up of the pancake to be at the outside of the winding. The only interpancake connections which span one or more intermediate pancakes are the FB finish-finish connections and these connections are located on the outside surface of the winding which is more accessible and less subject to damage due to pressure between the winding 8 and the winding 14. Because of the symmetry of the winding, the voltage stress between adjacent turns in each pancake is as much as possible the same.

It will be noted that in this embodiment of my invention, as in all embodiments of my invention which have an even number of strands per pancake, that the same voltage stress appears between adjacent turns in each pancake. This desirable condition obtains because the different circuits alternate from turn to turn. For example, in FIG. 1A successive A circuit turns are separated by a "B" circuit turn and vice-versa.

In embodiments of my invention which have an odd number of circuits in parallel the circuits are also alternated in each pancake from turn to turn. The pattern is not symmetrical however as will be explained later with reference to FIG. 4A.

Referring to FIG. 1B one may see in schematic form the embodiment of the invention illustrated in partial cross-section in FIG. 1A. The arrows such as arrow 18 illustrates the direction of current flow of the A and B circuits referred to in regard to FIG. 1A. It will be observed that in each of the pancakes I–VIII the direction of current flow alternates from pancake to pancake; this is standard practice in pancake type windings. In other words, the current flows in spirals from the center of the winding outward in one pancake and from the outside of the winding inward in the next pancake. Of course, the sense of each pancake i.e. the clockwise or counterclockwise direction with which the circuit spirals through each pancake is so chosen that each pancake coil produces an increment of magnetic flux which is additive to the increments of magnetic flux produced by all the other pancakes.

It will be observed that the A circuit traverses the winding serially from the top of FIGURE 1B to the bottom of FIGURE 1B from pancake to pancake using but one of the two strands of which each pancake is wound. The A circuit is connected between pancakes with alternate finish-finish and start-start connections. For example, the A circuit is connected from pancake I to pancake II with a finish-finish connection FA and from pancake II to pancake III with a start-start connection SA.

The B circuit traverses the winding from the top of FIGURE 1B to the bottom of FIGURE 1B by means of pancake pairs. For example, considering pancakes I and II as a pair, the B circuit enters the winding at the outside of pancake II and goes through pancake II via the strand not used by circuit A. The B circuit is then connected to pancake I with a start-start connection SB. The B circuit then goes through pancake I in a direction opposite to the way the circuit B went through pancake II. From the outside of pancake II, the B circuit then goes via a finish-finish connection FB to a second pair of pancakes III and IV which the B circuit traverses in the same manner as the pancake pair I and II were traversed. It will be observed that in each pancake the currents in the A and B circuits go through the pancake in the same direction as indicated by the arrows such as arrow 18 of pancake I.

The uniform voltage stress between adjacent turns of the strands or conductors in each pancake, previously mentioned as being desirable, may be illustrated by considering the line conductors of FIG. 1B, LA and LB which are connected to pancakes VII and VIII as being at zero potential 0; consider one unit of potential to be picked up by going through a pancake via one of the conductors against the direction of an arrow. The right hand end of conductor A of pancake VIII will have one unit of potential 1 as will the left hand end of the B conductor of pancake VII. By a similar analogy, continuing along the A and B circuits against the arrows, the left hand end of the A conductor of pancake VII will have two units of voltage 2 as will the right hand end of the B conductor of pancake VIII. The units of potential being as illustrated in FIGURE 1B at pancakes VII and VIII, one may see that the potential between the A and B conductors at the left hand of pancake VIII is one unit because the A conductor at this point is at zero potential and the B conductor is at one unit potential. At the right or outside end of pancake VIII it will be observed that the A conductor is at one unit potential and the B conductor is at two units of potential; hence, the potential difference between the A and B conductors at this point in the pancake VIII is also one unit of potential. If the strands of the pancake VIII have the same voltage stress between them at the start and finish of the pancake, due to the symmetry of the pancake, the potential between the A and B circuits will be the same as proximal everywhere in the pancake. A similar analysis holds for pancake VII where the units of potential between A and B circuits are two to one and one to zero at the left and right ends of the pancake respectively. Although the voltage stress between the A and B strands in but two pancakes has been analyzed, it will be understood that the potential between the A and B circuits is uniform throughout the winding in each two pancakes in this and all other embodiments of my invention. This uniformity of voltage stress between adjacent turns in each two pancakes furnishes a minimum initial voltage distribution constant and hence minimum turn to turn stress for a given thickness of insulation between the adjacent turns in each pancake.

Figure 2:
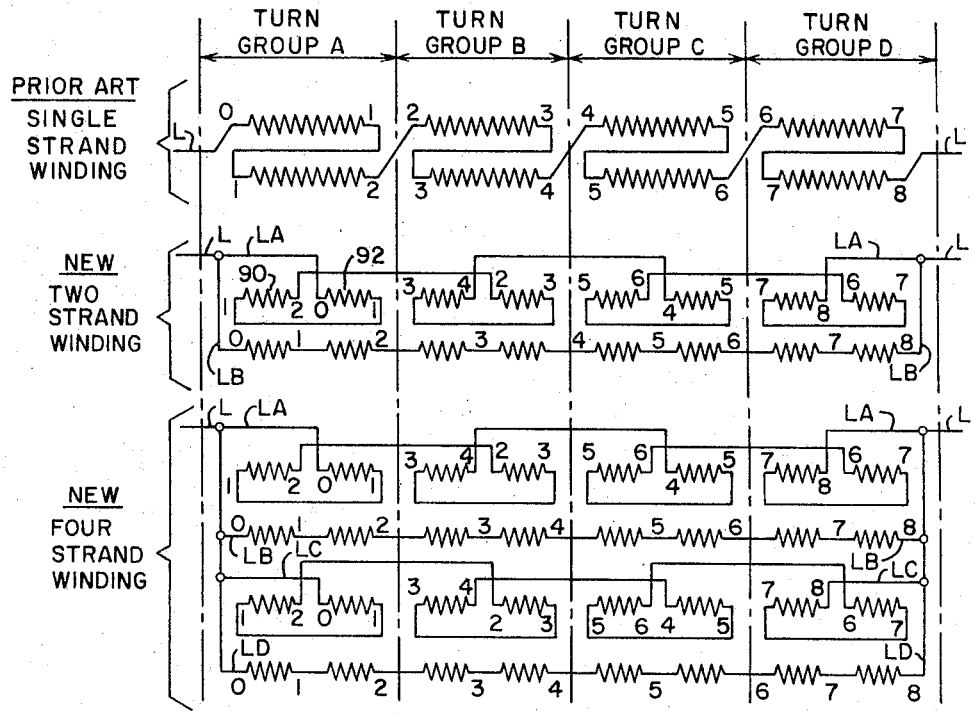
FIG. 2 is a generalized comparison in schematic form of my invention and a single strand interleaved winding of the prior art.
Figure 12:
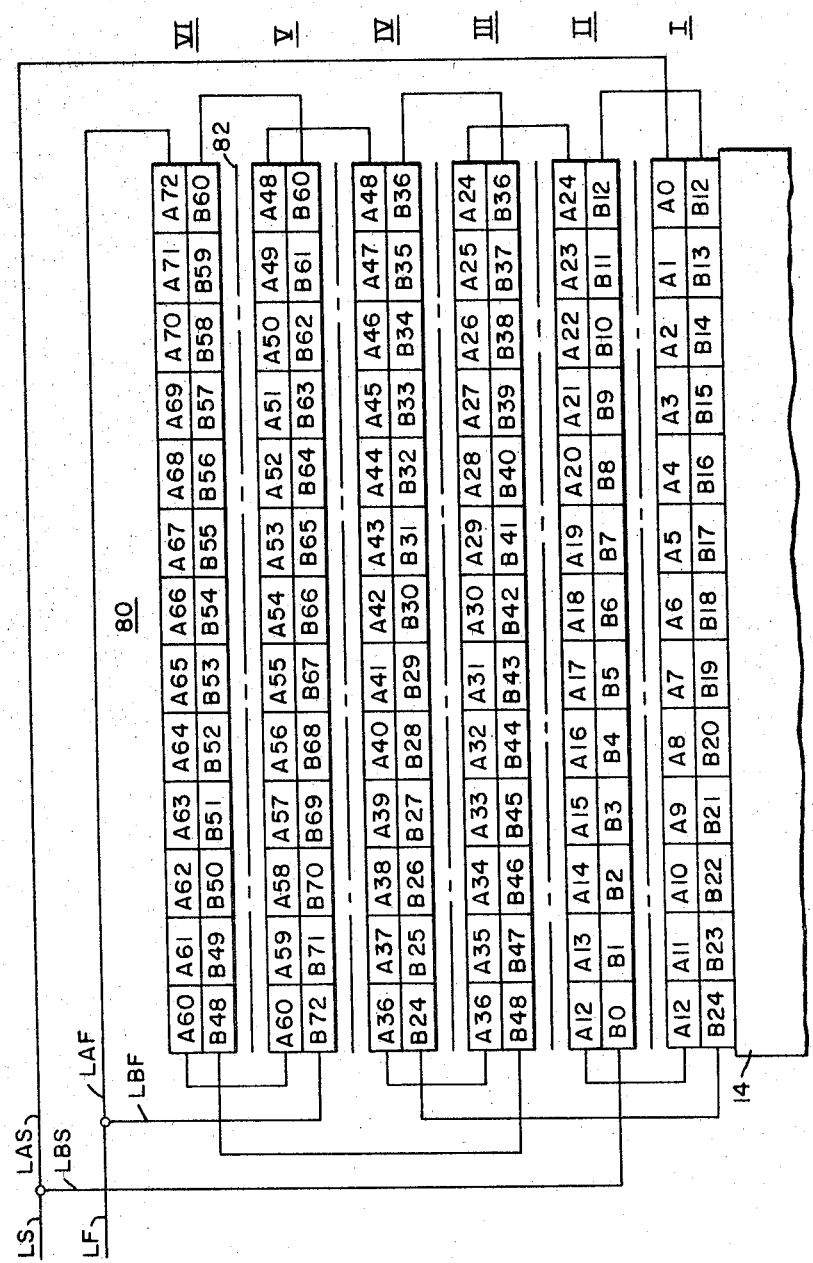
FIG. 12 is a partial transverse sectional view of a cylindrical type winding constructed according to the teachings of the invention.

In FIG. 2 I have ilustrated a comparison of a two strand and a four strand embodiment of my invention with a prior art single strand winding. It will be understood that turn groups A through D are generalized representations of winding units and may be either whole or fractional pancakes or layers of a layer wound winding such as illustrated in FIG. 12. These adjacent turn groups are to be interpreted as representing circuit elements which would usually lie one above the other in an actual transformer. Sections of windings which lie in the same vertical plane are disposed physically adjacent each other; for example, they may be adjacent turns of the winding. The numbers 1 to 8 are arbitrary voltage units and indicate that the voltages of adjacent branches of the parallel connected strands are everywhere one voltage unit apart. It will be observed that the two strand winding is a mixture of one straight through strand and one multiple interleaved strand, while the four strand winding is a mixture of two straight through strands and two multiple interleaved strands. It is to be understood that additional pairs of straight through strands and multiple interleaved strands may be connected in parallel circuit relation with the four strand winding shown in FIG. 2. If one thinks of the turn group A through D as representing a quarter of a winding unit such as a pancake, my generalized diagram may also be interpreted as a representation of quadruple interleaved winding units. If the turn groups are regarded as each representing a half of a winding unit, such as a pancake, the diagram will then represent double interleaved winding units. If the turn groups are each considered to represent a single pancake, the diagram may then be considered to represent a single interleaving. It will be understood that each embodiment of my invention has at least one through current path from turn group to turn group. Each embodiment also has at least one current path in parallel with the through current path or paths. This parallel path may not go straight through each turn group but rather may go through each turn group by means of two segments. For example, it will be observed that in one circuit of turn group A of the two strand winding, there are two segments 90 and 92. The turn group segment 90 is physically first in space relationship as the winding is scanned from left to right. However, the turn group segments 90 and 92 are connected so that a series electrical circuit is formed first through the physically second coil group segment 92 and then through the physically first coil group segment 90. The turn groups are connected in series as in the through circuit.

Figure 3A:
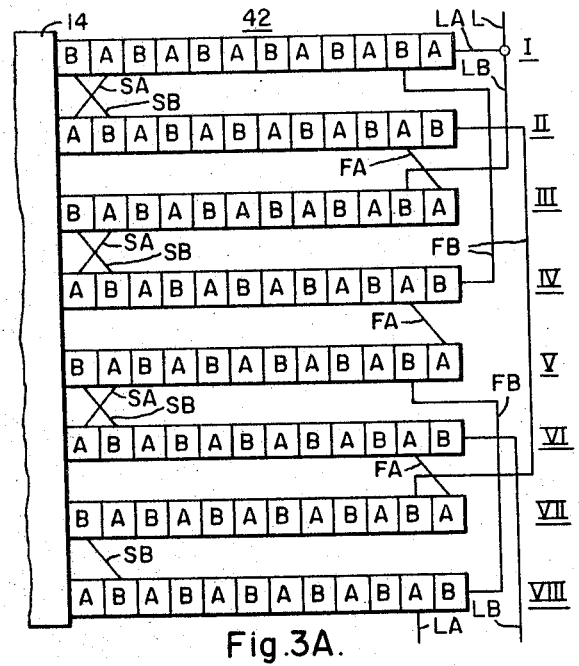
FIG. 3A is a partial transverse sectional view of another embodiment of the invention.
Figure 3B:
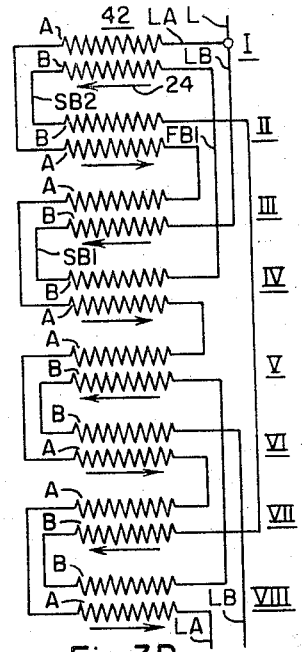
FIG. 3B is a schematic diagram of the modification of the invention illustrated in FIG. 3A.

A third embodiment of the invention is illustrated in FIGS. 3A and 3B. This embodiment of the invention, as the previously described embodiments, utilizes a plurality of pancakes 42 each wound of two electrically insulated conductors or strands. The strands are then interconnected into two circuits which shall be referred to throughout as the A circuit and the B circuit. Eight pancakes I through VIII are illustrated, although it will be understood that the winding as actually used has both a greater number of pancakes and a greater number of turns per pancake.

As in the previous embodiments of the invention, the A circuit is formed by connecting one strand in each pancake to a strand in the adjacent pancakes with alternate start-start and finish-finish connections. It will be understood that the A circuit as well as the B circuit is transposed from pancake to pancake by connecting differently located strands from pancake to pancake.

The pancakes are interconnected so that the B circuit passes through the winding by means of consecutive groups of four pancakes each such as pancake groups I to IV and V to VIII. The B circuit is connected first to the outside of the third pancake of each four pancake group. The inside of the third pancake of each four pancake group is connected to the inside of the fourth pancake of each four pancake group by means of a so called start-start connection such as SB1. The outside of the fourth pancake of each four pancake group is connected to the outside of the first pancake of the group by means of a so-called finish-finish connection such as FB1. The inside of the first pancake of the group is connected to the inside of the second pancake of the group by means of a start-start connection SB2; from the outside or so called finish turn of the second pancake of each four pancake group the B circuit is connected to the next consecutive group of four pancakes where the above-described interleaving is repeated.

Alternatively, the B or four pancake group circuit in this embodiment of my invention, and in other embodiments of my invention where groups of four pancakes or discs are mentioned, may be considered as comprising groups of two adjacent pancakes. For example, in FIGS. 3A and 3B the four pancake group I to IV may be thought of as 2 groups of 2 adjacent pancakes each III–IV and I–II.

It will be noted that in this embodiment of the invention, as in all embodiments of the invention, the space between pancakes is kept free of connections which leave from and reenter the same pancake. All connections between pancakes are either start-start connections or finish-finish connections and all of the connections which span one or more pancakes are located on the outside surface of the winding. My invention obviates the need for start-finish connections between pancakes; such connections are both difficult to make and wasteful of space and material.

Figure 4A:
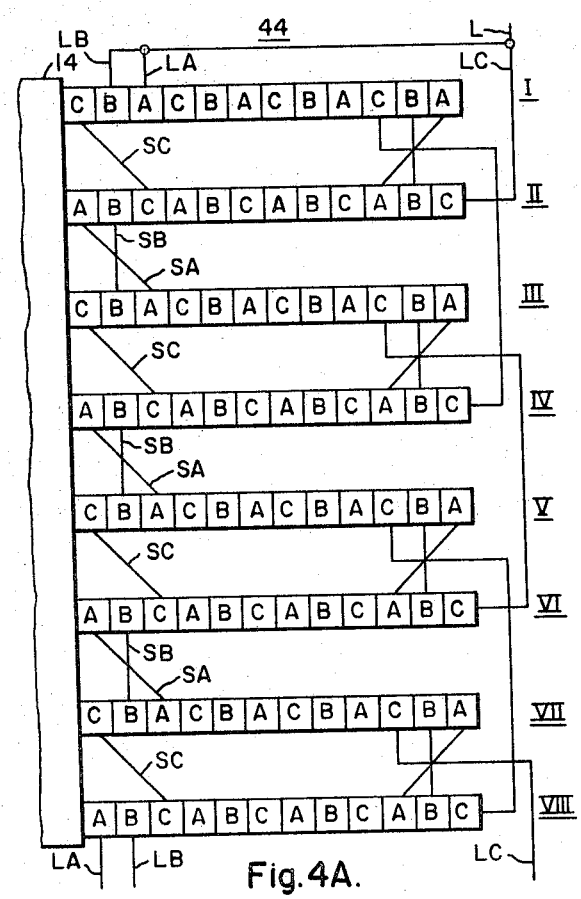
FIG. 4A is a partial transverse sectional view of a modification of the invention employing three conductors in parallel.
Figure 4B:
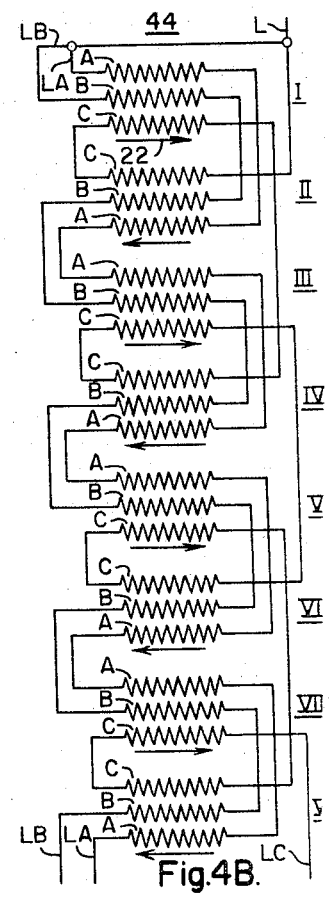
FIG. 4B is a schematic diagram of the embodiment of the invention illustrated in FIG. 4A.

Yet another embodiment of my invention is illustrated in FIGS. 4A and 4B. I wind each pancake with three electrically insulated strands or conductors. I have found that this can be conveniently done by using a horizontal rotating mandrel and feeding it with three conductors one on top of the other simultaneously from three different spools of flat conductors. The mandrel is revolved until a flat disc coil or pancake of the desired number of turns has been built up. Because of this method of constructing the pancakes, I find it convenient to refer to the inside of the pancake which is closest to the inner winding 14 as the start of the pancake and to the outside of the pancake which is furthest to the right in FIG. 4A as the finish of the pancake.

I stack a plurality of these pancakes I to VIII one above the other and then interconnect them to form the winding indicated generally as 44. I then interconnect the pancakes to form three parallel circuits through the windings. These circuits are in all pancakes indicated as the A, B and C circuits. In connecting the pancakes, I follow the teachings of the embodiment of the invention illustrated in FIGS. 1A and 1B that the stress between adjacent turns must in all pancakes be the same and start-start connections between pancakes should not cross underneath intervening pancakes. The start-start and finish-finish connections of my invention may be made between one end of a pancake and the closest end of another pancake in the same winding; the connections do not cross the face of the pancakes.

It will be noted that the parallel connected A and B circuits are located at adjacent turns throughout the pancakes; this slight defect in the order of turns exists in any embodiment of my invention which has an odd number of strands and circuits. The uniformity of the voltage stress between circuits is not adversely affected by this slight deviation from a perfect alternation of the A, B and C circuits from turn to turn because the A and B circuits are essentially at the same potential at proximal points throughout the winding. As best seen in FIG. 4B, the pancakes are interconnected using start-start and finish-finish connections only so that the A and B circuits go through the winding together by means of consecutive pancakes, reversing direction from pancake to pancake. The connections between pancakes for these circuits are alternately start-start and finish-finish connections on the inside and outside surfaces of the winding 44 respectively. For all practical purposes, there is no voltage difference between the A and B circuits at proximal points along their lengths.

The C circuit traverses the winding by means of a strand or conductor in each pancake which is not used by the A and B circuits; the C circuit reverses direction from pancake to pancake also. The C or third circuit is connected through the winding 44 by means of consecutive pairs of pancakes such as pancake pairs I, II and III, IV the C circuit is connected first to the outside of the second pancake of each pancake pair and then from the inside of this pancake to the inside of the first pancake of the pair. The C circuit then goes to the next pancake pair by means of a finish-finish connection on the outside surface of the winding from the outside of the first pancake of one pancake pair to the outside of the second pancake of the next pancake pair of the winding. As previously mentioned, the conductor strands are transposed between pancakes. For example, in FIG. 4A the sequence of circuits in pancake I reading left to right from the inside out is C–B–A in pancake II the sequence of circuits in the pancake reading in the same direction from a similar point is A–B–C. It will be noted that all the connections which span intermediate pancakes are located on the outside surface of the winding 44 where the least disturbance is caused to the magnetic field and where maximum accessibility is obtained.

Figure 5A:
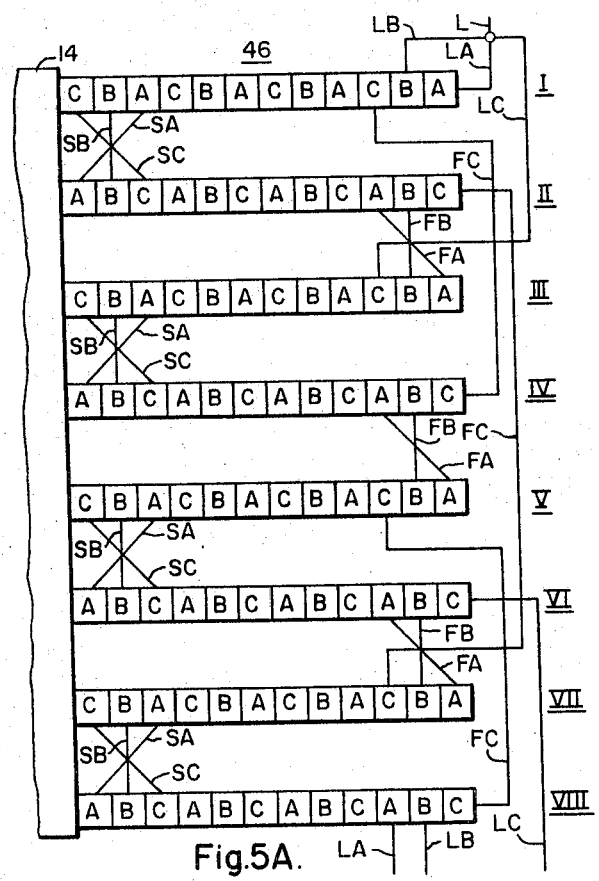
FIG. 5A is a partial transverse sectional view of a portion of a pancake winding embodying a modification of the invention adapted to three parallel conductors.
Figure 5B:
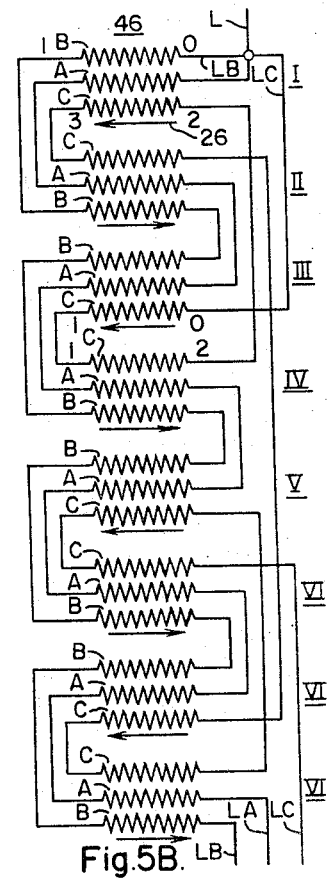
FIG. 5B is a schematic diagram of the embodiment of the invention illustrated in FIG. 5A.

A second embodiment of the invention utilizing three strands per pancake for high current carrying capacity is illustrated in winding 46 shown in FIGS. 5A and 5B. This embodiment of the invention has the advantage of twice the voltage stress between one of the three conductors in each pancake and the other two conductors of the pancake as compared to FIGS. 5A and 5B. As in the previous embodiment of the invention, two of three circuits in each pancake which are again designated the A and B circuits go through the winding together reversing direction of pancake to pancake. These two circuits are connected between consecutive pancakes by alternate start-start and finish-finish connections on the inside and outside surfaces of the winding respectively. For all practical purposes, the potential between these two circuits at proximal points may be considered to be zero. A third circuit which is again designated the C circuit throughout FIGS. 5B and 5C is connected through the winding 4C by means of the strand in each pancake not used by the A and B circuits previously discussed. The C circuit is connected through the winding by using consecutive groups of four pancakes each; such as pancake groups I, II, III, IV and V, VI, VII, VIII; in each group C circuit is connected first to the outside of the third pancake of the group. The inside of the third pancake of the group is then connected to the inside of the fourth pancake of the group by means of a start-start connection. The outside of the fourth pancake of the group is connected to the unused strand of the first pancake at the outside of the first pancake of the group by means of a finish-finish connection. The unused strand of the first pancake is connected at the inside of the first pancake to the inside of the unused strand of the second pancake of the group at the inside of the second pancake by means of a start-start connection. The C strand of the second pancake is then connected from the outside of the second pancake to the next successive group of four pancakes by means of a finish-finish connection. As in all embodiments of the invention, connections to the strands are made so that in each circuit the strand being used for that circuit is transposed from pancake to pancake. The degree of interleaving and consequently the voltage stress between the C circuit and the combination of the A and B circuit is twice that between corresponding circuits in the embodiment of the invention illustrated in FIGS. 4A and 4B. To understand how the voltage stress between turns in the pancake is doubled, consider that one unit of voltage stress is picked up when one strand traverses one pancake. If in pancake I of FIG. 5B we consider that there is zero voltage on the right-hand side of the B strand and that one unit of voltage will be picked up by going in the direction of the arrows such as arrow 26, the potential at the left-hand side of the B conductor of pancake I will be one unit of voltage. The same analysis will hold for the A conductor of pancake I in FIG. 5B. Now considering the C circuit which enters the winding via a line conductor LC, assume that where the C circuit enters pancake III that the potential is zero. One unit of voltage will be picked up by the C conductor going through pancake III. The C circuit then goes to pancake IV where a second unit of voltage is picked up, making the total voltage at the right or outside of pancake III now two units. The C circuit now travels via a finish-finish connection to pancake I which also will be at two units of voltage potential. After the C circuit traverses pancake I the left-hand side of the C conductor in this pancake will be at three units of potential. It will now be observed that in the pancake I of FIG. 5B at the right-hand side which represents the outside of the pancake that two units of potential will exist between the C conductor and either the A or B conductors; at the left-hand side of the pancake I which represents the inside of the pancake, because the A and B conductors are at one unit of potential and the C conductor is at three units of potential, two units of potential will exist between the C conductor and either the A or B conductors. A similar analysis will hold for all the other pancakes of the winding 46. This double degree of interleaving has been achieved solely by the use of start-start and finish-finish connections and without the use of any connections which start and finish in the same pancake or section. No start-finish connections between pancakes are required; a start-finish connection is one that goes from the inside to the outside of the winding.

Figure 6A:
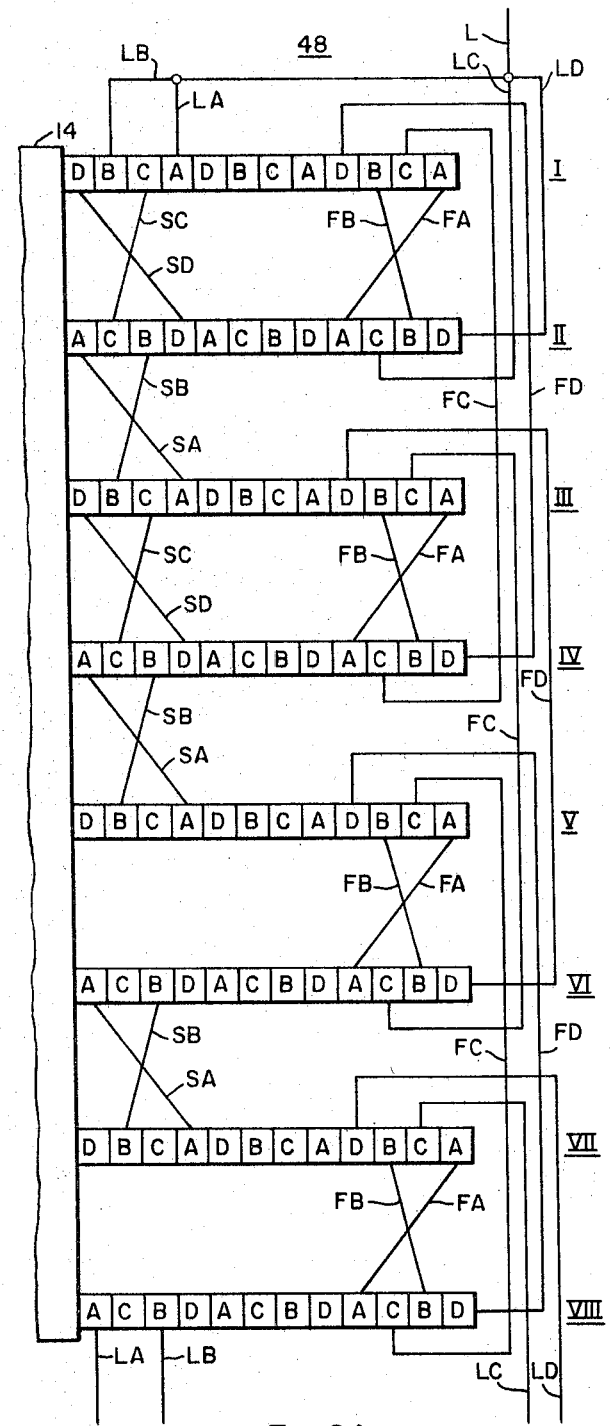
FIG. 6A is a partial transverse sectional view of an interleaved pancake winding embodying the teachings of the invention as applied to four parallel connected conductors.
Figure 6B:
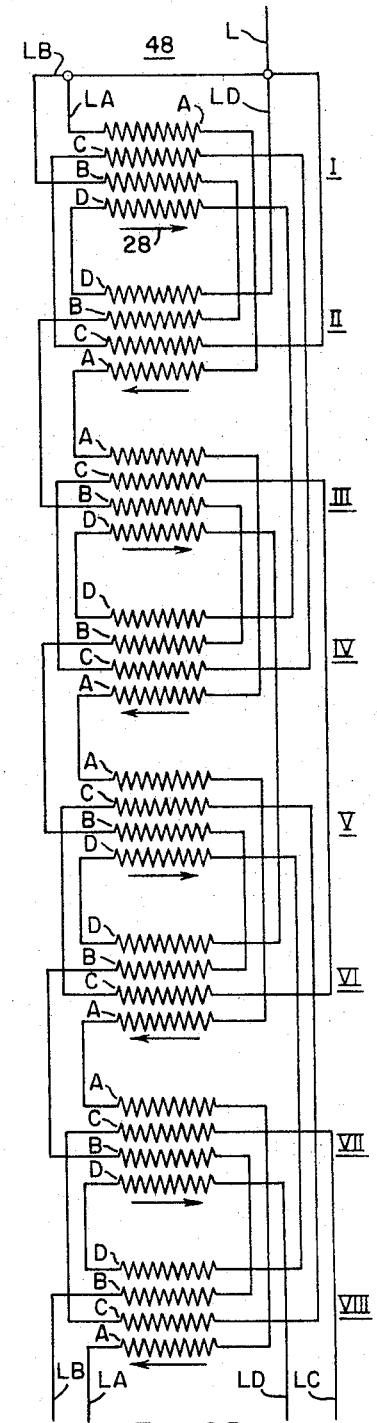
FIG. 6B is a schematic diagram of the embodiment of the invention illustrated in FIG. 6A.

Referring to FIGS. 6A and 6B, there is illustrated an embodiment of the invention in which each pancake is wound from four electrically insulated conductors and a single degree of interleaving is achieved. By a single degree of interleaving it will be understood that I mean that the voltage between adjacent conductors in any pancake is equal to the voltage picked up by one strand traversing a pancake. As previously discussed, a multiple strand pancake may be produced by simultaneously feeding four conductors one on top of the other to a rotating mandrel. It will be understood that in a pancake produced this way the order of conductors from the inside surface of the pancake outward will be the opposite of the order of the conductors from the outside inward. For example, if the conductors are designated D, B, C and A and are placed on the mandrel in that order, when the pancake is wound up the order of conductors proceeding inward radially from the outmost conductor will be A, C, B, D. This is illustrated best in pancake I, FIG. 6A. The winding 48 is produced by interconnecting pancakes I to VIII with start-start and finish-finish connections; all connections which span intermediate pancakes are located on the exterior surface of the winding 48 which is the right-hand side of both FIGS. 6A and 6B. Four circuits are produced through the windings which are generally designated as the A, B, C, and D circuits. As in all embodiments of the invention, the current travels in the same direction in all strands of each pancake.

The A and B circuits, which are essentially at the same potential as proximal points throughout the winding 48, traverse the winding 48 by means of consecutive pancakes I to VIII which are connected by alternate finish-finish and start-start connections. The direction with which these circuits spiral is reversed from pancake-to-pancake. For example, if the A and B circuits spiral inward in one pancake they will spiral outward in the next pancake. The reason for this change of direction is to make the magnetic flux produced by each pancake add to the magnetic flux produced by every other pancake while at the same time simplifying the connections between pancakes. In FIG. 6B the arrows such as arrow 28 of pancake I indicate the relative direction or sense of the pancake spiral.

The C and D circuits traverse the pancakes by means of the two strands in each pancake not used by the A and B circuits. The C and D circuits also change direction of spiraling from pancake-to-pancake. The C and D circuits traverse the winding by means of consecutive pairs of pancakes or winding sections such as pancake pairs I, II and III, IV; the C and D circuits are connected first to the outside of the second pancake of each pancake pair. From the inside of the second pancake of the pancake pair the circuit is then connected to the inside of the first pancake of the pair by means of a start-start connection. From the outside of the first pancake of the pair the C and D circuits are connected to the outside of the second pancake of the next consecutive pancake pair by means of a finish-finish connection. As in all embodiments of the invention, each circuit traverses each pancake by means of a strand other than the corresponding strand used in the preceding pancake. This method of transposition is used to minimize circulating currents.

Figure 7A:
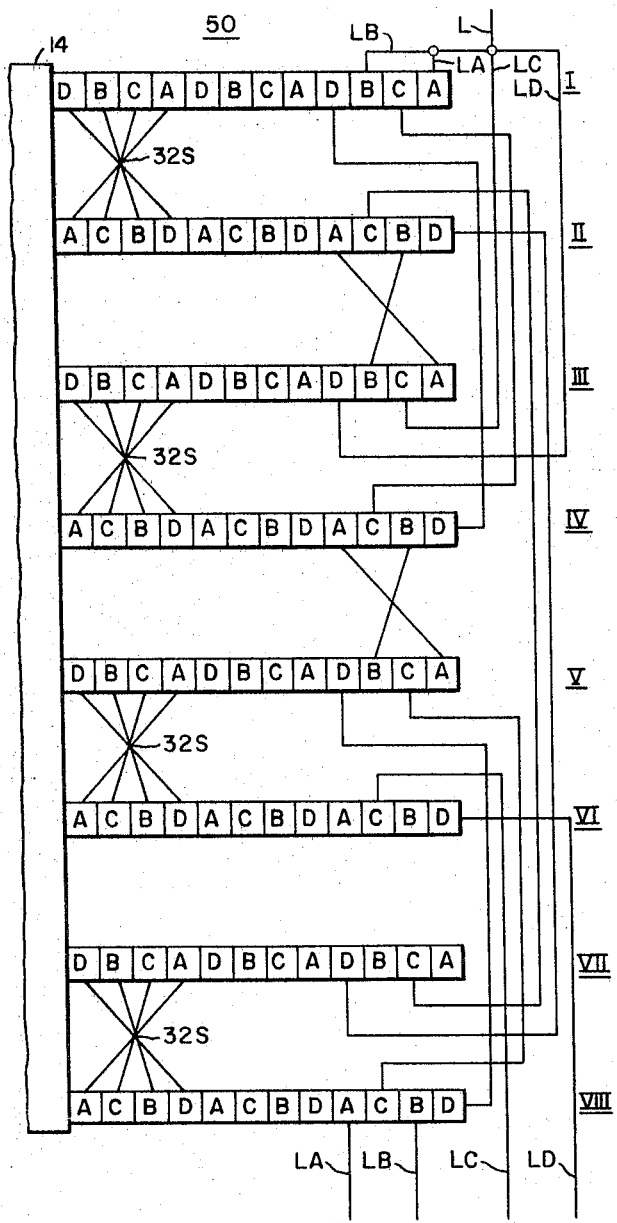
FIG. 7A is a partial sectional view of another embodiment of the invention using four parallel connected strands per pancake.
Figure 7B:
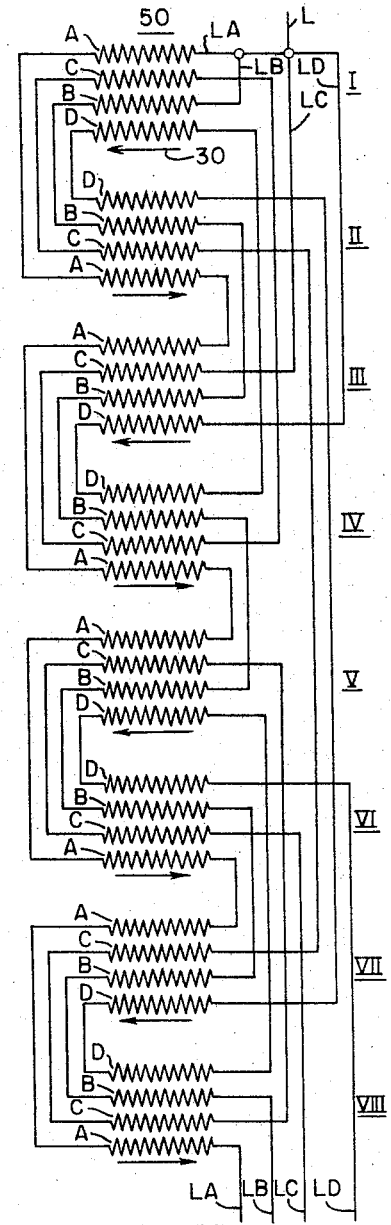
FIG. 7B is a schematic diagram of the embodiment of the invention illustrated in FIG. 7A.

A second embodiment of the invention which uses four strands per pancake is illustrated in FIGS. 7A and 7B. This embodiment of the invention produces a winding 50 which has twice the degree of interleaving and hence twice the voltage between the A–B and the C–D circuits at proximal points in the pancakes as the embodiment of the invention illustrated in FIGS. 6A and 6B. The high voltage, high current interleaved winding 50 is built up of a plurality of pancakes illustrated by pancakes I–VIII. The four circuits through the winding 50 are referred to throughout as the A, B, C and D circuits. All connections between pancakes are made either as start-start or finish-finish connections. In FIG. 7A it will be understood that but half of the winding 50 is shown and that the winding 50 is placed around a magnetic core (not shown) which is to the left of the adjacent inner low voltage winding 14. The start-start connections are designated collectively 32S in FIG. 7A; in FIG. 7A the start-start connections 32S appear to reach quite a way into the winding to connect to the fourth turns from the adjacent inner winding 14, this is due to the exaggerated size of the turns for purposes of clarity. It will be understood that many more turns are used per pancake in the winding 50 as manufactured than in the illustrative example. Hence, for all practical purposes, the first four turns of the pancake are located at the start of the pancake and the last four turns of each pancake are located at the finish of the pancake.

The schematic diagram of FIG. 7B perhaps illustrates better how the start and finish connections are made. Referring to pancakes I and II of FIG. 7B, the transposition of strands from pancake-to-pancake will be illustrated. Reading from the top down the circuits to which the four strands of pancake I are connected are A, C, B and D circuits; reading downward in pancake II the sequence of circuits for the pancake strands is D, B, C, A. These sequences alternate for the rest of the pancakes to equalize the winding and prevent circulating currents.

The degree of interleaving of this winding is such that in each pancake the voltage difference between the any two of the four parallel circuits is twice the voltage that one strand picks up traversing one pancake. An illustration of this degree of interleaving was given with reference to FIG. 5B and will not be treated further except to say that in any given pancake two of the circuits always enter the pancake with two units of voltage greater than the other two circuits.

The A and B circuits go through the winding exactly the same as the A and B circuits in FIGS. 6A and 6B and hence will not be considered further.

The third and fourth or C and D circuits however, pass through the winding by means of consecutive groups of four pancakes or sections each such as groups I, II, III, IV and V, VI, VII, VIII. The C and D circuits use the two strands in each pancake not used by the aforementioned A and B circuits; the C and D circuits are connected from the line terminal L via line connections LC and LD to the outside of the third pancake III of the first pancake group from the top of each figure. At the inside of this pancake III, the C and D circuits are connected to the inside of the fourth pancake of the group by means of start-start connections. After going through the fourth pancake of the group, the C and D circuits are connected to the outside of the first pancake of the group with finish-finish connections. It will be noted that in this embodiment of the invention, all connections which span intermediate pancakes are located on the outside surface of the winding or on the far right in both FIG. 7A and FIG. 7B. At the inside of the first pancake I of the first group of four pancakes, the C and D circuits are connected with start-start connections to the inside of the second pancake II of the group. The C and D circuits then go through the second pancake II in the opposite direction from which they went through the first pancake I; the C and D circuits are then connected on the outside surface of the winding 50 from the outside of the second pancake to the next consecutive group of four pancakes V, VI, VII and VIII. As in all embodiments of the invention, it will be understood that a great number of pancakes are used; the space between pancakes has been exaggerated in FIG. 7A, and in all the other figures, to more clearly show how the start-start and finish-finish connections between pancakes are made.

More than one of the various embodiments of this invention may be combined in one winding to take advantage of the different degrees of interleaving and series capacitances disclosed. For example, using graded insulation as taught by my copending application Serial No. 222,559, now Patent No. 3,246,270, filed September 10, 1962, FIG. 3 could be used at the line end of the winding and FIG. 1 in the rest of the winding; similarly, FIG. 7 could be used at the line end and FIG. 6 could be used in the rest of the winding.

Figure 8A:
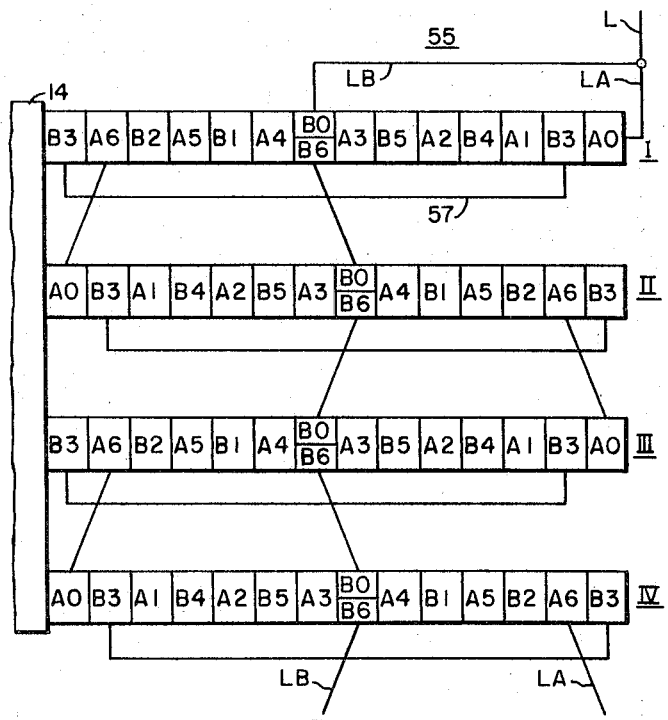
FIG. 8A shows an embodiment of my invention in which two parallel conductors are double interleaved.
Figure 8B:
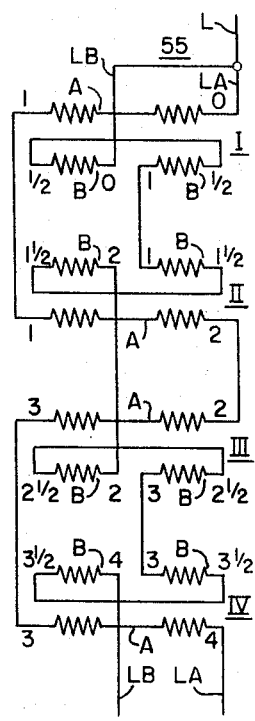
FIG. 8B is a schematic diagram of the embodiment of my invention illustrated in FIG. 8A.

Referring to FIGS. 8A and 8B, there is illustrated an embodiment of my invention in which one of two parallel conductors is interleaved more than once in each coil section or pancake. I refer in general to this mode of interleaving as multiple-interleaving.

In FIG. 8A, there is illustrated a partial transverse sectional view of a first winding 14 and a second winding 55. The winding 55 is built up of a plurality of sections or pancakes. Pancakes I–IV are illustrative of the winding. Each pancake is wound with two insulated conductors simultaneously. The conductors are then interconnected to form an A circuit and a B circuit which are in parallel to increase the current carrying capacity of the winding 55. I start the A circuit at turn A0 at the outside of pancake I. The A circuit then spirals inward or to the left in the figure towards winding 14, by means of every other turn, to turn A6 near the far left of the winding 55. The A circuit then goes to turn A0 of the second pancake II at the inside of the winding 55 and then spirals outwards by means of every other turn to turn A6 of pancake II. This mode of traversing the pancakes with the A circuit is then repeated in all the other pancakes of the winding 55. Now we will consider the B circuit which uses the turns in each pancake which have not been used by the A circuit; in pancake I, I start the B circuit at turn B0 at the center of the pancake. It appears that turn B0 and turn B6 occupy the same space. However, as will be understood by those versed in the art of pancake coils, the turns B0 and B6 do not overlap but rather are the first and last turns of the B circuit of the pancake I. From the turn B0, the B circuit spirals towards the left by means of every other turn to the innermost turn B3 of pancake I. The B circuit then goes to turn B3 near the far right in pancake I. The apparent ambiguity of having two turns in each pancake designated B3 is explained by the fact that the two turns designated B3 in pancake I are directly connected external to the pancake by means of the strap 57 and hence for all practical purposes are at the same electrical potential. From the outer turn B3 of pancake I, the B circuit again spirals inward or to the left to the previously mentioned turn B6 where the B circuit is then connected to pancake II. In pancake II, the B circuit is interleaved in an analogous manner to pancake I except that the B circuit spirals to the right or away from the winding 14. As has been previously discussed, the direction of the spirals alternate from pancake to pancake so that the magnetic relationships of the pancakes are additive. Pancakes III and IV are similarly interleaved.

The multiple interleaving of the B circuit in this embodiment of my invention may best be seen with reference to FIG. 8B. The B circuit is double interleaved in each pancake. For example, in pancake I, the B circuit enters the winding via conductor LB from the line conductor L. We will consider the LB conductor to be at zero potential and it is so marked; the B circuit then travels through half a pancake picking up a half an arbitrary unit of potential. The B circuit then continues via strap 57 to the other end of pancake I where it goes through the other half of the pancake picking up another half unit of potential to make the potential on the B circuit one unit at the point where the B circuit continues to pancake II. In pancake II, the B circuit picks up two more half voltage units by traversing pancake II by means of separate halves in the opposite direction from which the B circuit traversed pancake I. The B circuit then continues through the winding alternating its direction from pancake to pancake and picking up one unit of voltage in each pancake.

The A circuit traverses the winding 55 in a straight forward manner from pancake to pancake picking up one unit of voltage in each pancake. It will be understood that the relative voltage levels are as indicated and are cumulative from pancake to pancake. Of course, the direction of current in the A circuit in each pancake is the same as the direction of current in the B circuit in the same pancake.

Figure 8C:
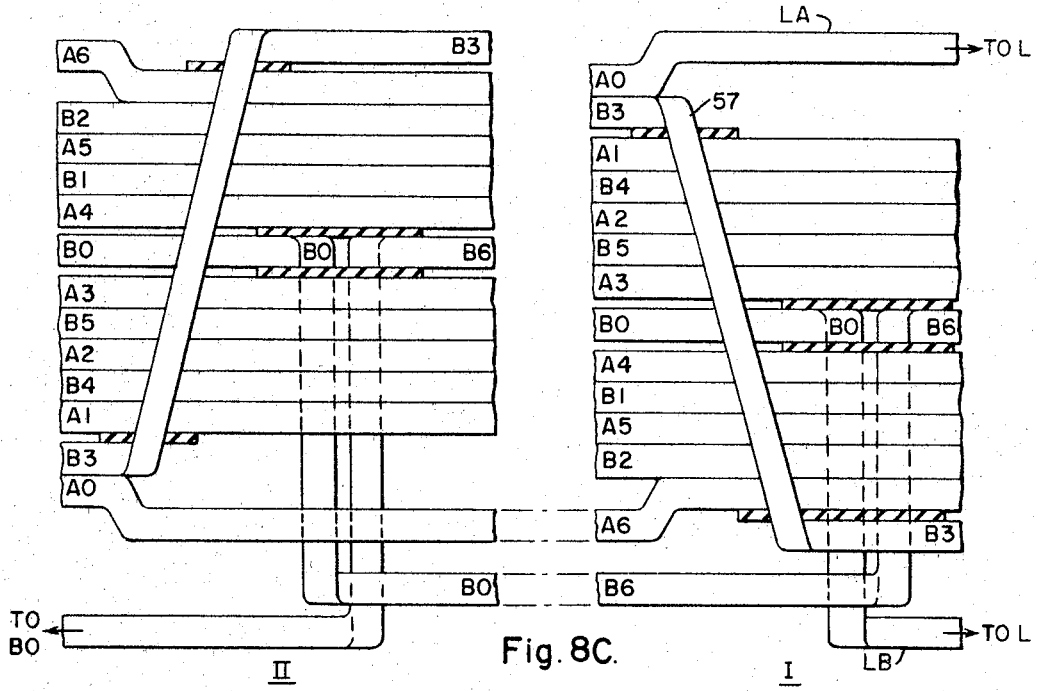
FIGS. 8C and 8D show side and top views, respectively, of how the individual conductors may be arranged in the embodiment of the invention shown in FIG. 8A.
Figure 8D:
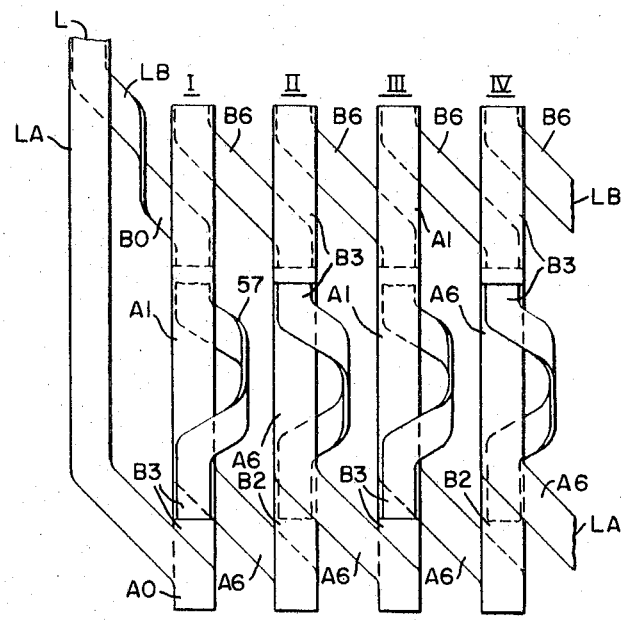

FIGS. 8C and 8D are side and top views, respectively, of the embodiment shown in FIG. 8A, and are included to show how the actual conductors of this embodiment may be arranged.

Figure 9B:
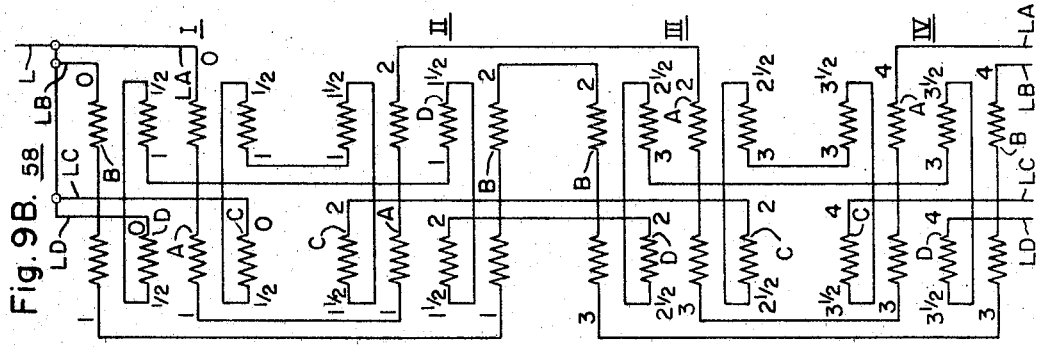
FIG. 9B is a schematic diagram of the embodiment of my invention illustrated in FIG. 9A.
Figure 9A:
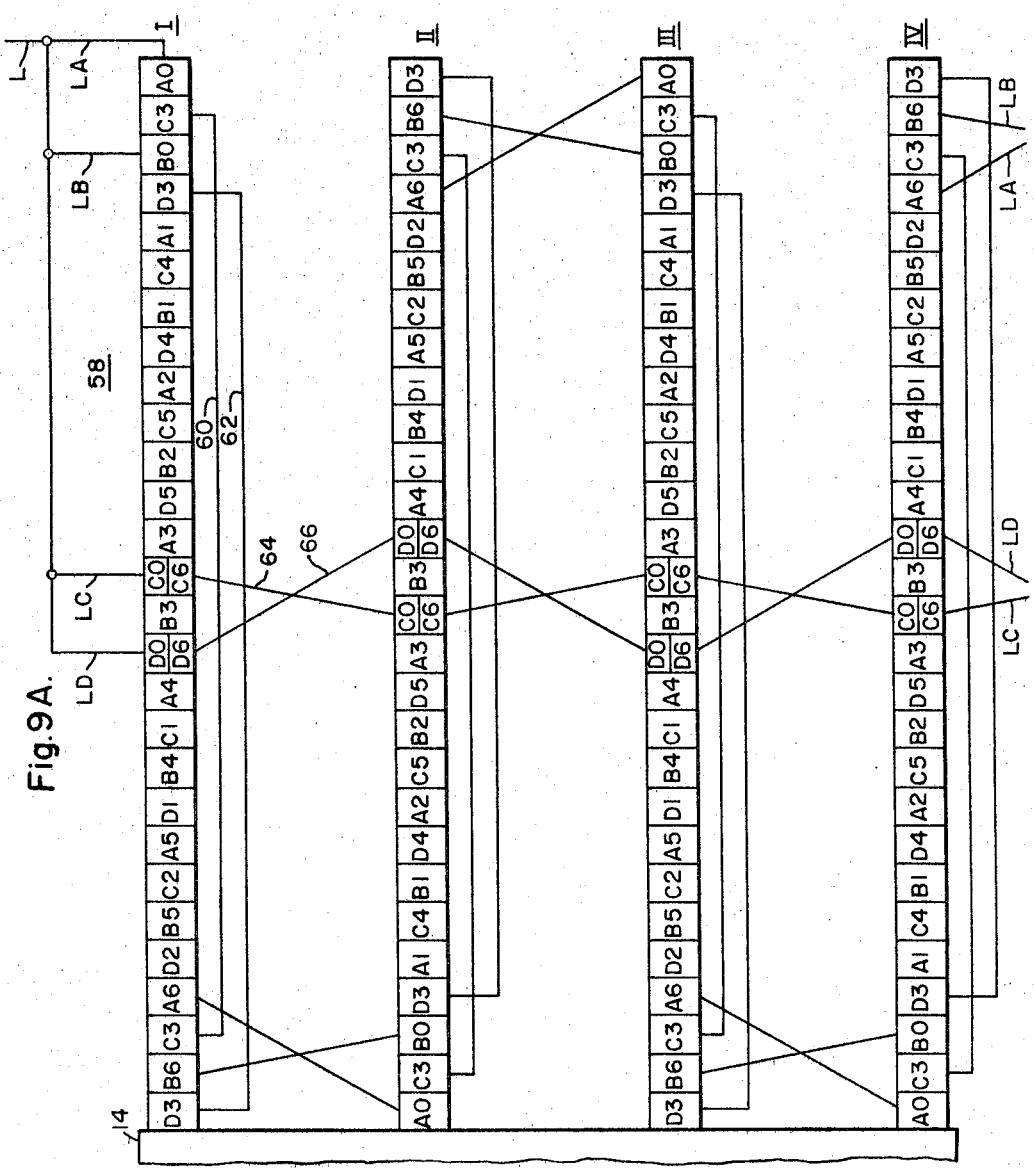
FIG. 9A illustrates an embodiment of my invention in which four parallel conductors are double interleaved.

One may see at FIGS. 9A and 9B a double interleaved embodiment of my invention applied to four conductors in parallel for even greater current carrying ability. Referring particularly to FIG. 9A, there is illustrated an electrical transformer comprising a first winding 14 and a second or interleaved winding 58. The winding 58 is illustrated by four typical pancakes I–IV. Each of these pancakes is constructed by winding four conductors on top of one another into a flat coil. The first circuit we shall consider is the A circuit which starts at the upper right hand corner of pancake I at turn A0. The A circuit spirals inward or to the left through every fourth turn to turn A6 near the far left or inside of pancake I. The A circuit then goes to the innermost turn A0 of pancake II where it spirals outward or to the right to turn A6 near the outside or far right of pancake II. The A circuit continues through the winding in this manner. Similarly, the B circuit starts at turn B0 near the far right or outermost surface of pancake I. The B circuit then spirals in the same direction as the A circuit, also by means of every fourth turn to turn B6 of pancake I. The B circuit then continues to a turn B0 near the inside of pancake II and spirals through pancake II in the same direction as the A circuit. The C and D circuits enter pancake I at a point close to the center of pancake I. From the initial turns D0 and C0, the C and D circuit spiral to the left to turns C3 and D3, respectively. The C and D circuits are then connected by connections 60 and 62 to turns also designated C3 and D3 near the outside of the pancake I. These connections 60 and 62 are known in the art as top to bottom connections. The C and D circuits again spiral inward or to the left to the turns C6 and D6 near where they started. The C and D circuits are then connected to points near the center of pancake II by means of connections 64 and 66. In pancake II, the D and C circuits are similarly interleaved with the A and B circuits with the exception that the direction in which the C and D circuits spiral is opposite to that of pancake I. Pancakes III and IV are similarly connected. Of course, it will be understood that in each pancake the A, B, C and D circuits all spiral in the same direction so that the magnetic field set up by each circuit is additive to the magnetic fields set up by the other three circuits. The A and B circuits may be considered as a first circuit group and the C and D circuits may be thought of as a second circuit group.

Referring particularly to FIG. 9B, it will be observed from the voltage notations that each circuit picks up one unit of voltage by traversing each pancake. The A and B circuits go directly through each pancake to pick up their one unit of voltage; the C and D circuits go through each pancake one half of the turns at a time picking up a half unit of voltage each time for a total of one unit of voltage per pancake.

Figure 10B:
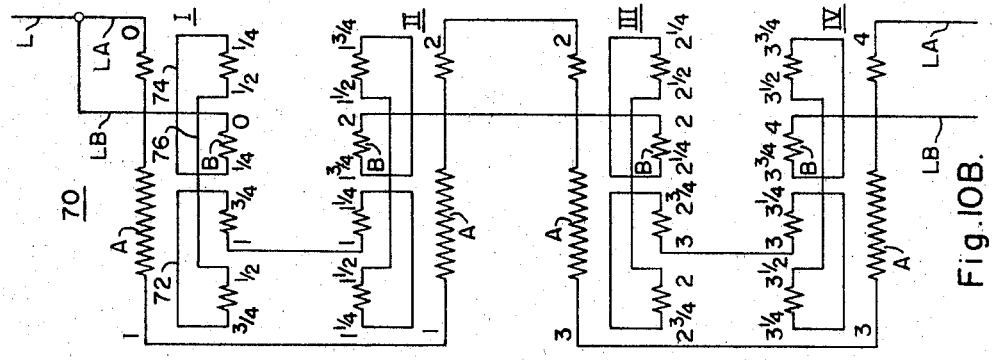
FIG. 10B is a schematic diagram of the embodiment of my invention illustrated in FIG. 10A.
Figure 10A:
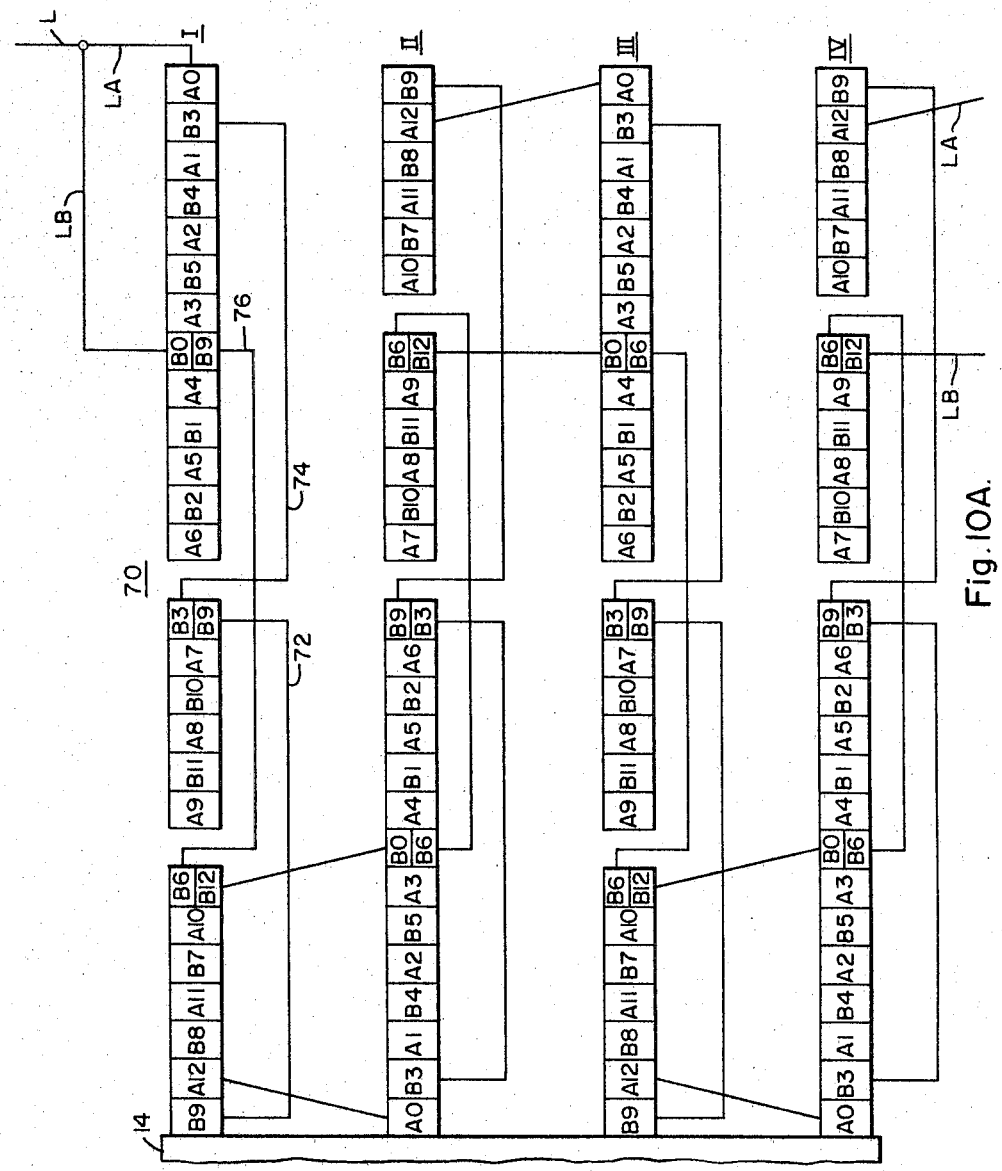
FIG. 10A shows a partial transverse sectional view of a winding embodying the teaching of my invention applied to quadruple interleaved parallel conductors.

Referring to FIGS. 10A and 10B of the drawings, there is illustrated an embodiment of my invention which uses two conductors wound into each of a plurality of pancakes I–IV to be interconnected to form two parallel circuits which are referred to throughout as the A circuit and the B circuit.

It will be observed from FIG. 10A that a winding 70 has been provided with an A circuit which goes straight through each pancake by means of every other turn and a B circuit which is quadruple interleaved. By quadruple interleaved, I mean that as far as the B circuit is concerned each pancake is divided into four parts or quarter sections. The B circuit goes through each of these parts in a sequence which will be described later with reference to FIG. 10B. It will be observed that but three top to bottom connections 72, 74 and 76 are used between the pancakes I and II. These top to bottom connections are so called because in the position in which the pancakes are wound, such connections extend from one level of a pancake to a lower level of pancake. It will be observed that the B circuit turns B0, B3 and B6 are located at the points where the pancake is divided into quarters as are the turns B9 and B12. This winding has the same distribution constant as the single conductor quadruple interleaved winding disclosed at FIG. 9 in my copending application Serial No. 222,559, filed September 10, 1962. The number of top to bottom connections required however has been reduced from four to three.

Referring particularly to FIG. 10B, it will be observed that looking from the top of the winding 70 to the bottom of the winding 70, that the A circuit starts from a line conductor L, goes through an A circuit line conductor LA and then through the pancakes I–IV of the winding. The A circuit reverses its direction from pancake to pancake. As the numerals indicate, each circuit shall be considered as picking up one unit of voltage by traversing one pancake. The B circuit takes a more involved path through each pancake than does the A circuit. In pancake I, it can be observed that the B circuit enters the winding via conductor LB from a line conductor L at a point approximately one quarter way in from the extreme right of the pancake. The B circuit then goes to the left to a point near the center of the pancake picking up one quarter of a voltage unit. The B circuit is then strapped back via conductor 74 to the extreme right of pancake I where it again travels to the left through another quarter of the pancake picking up a second quarter unit of voltage making the total B circuit voltage equal to one half voltage unit. The B circuit is then strapped via conductor 76 to a point approximately one quarter way in from the extreme left of pancake I where it traverses a third quarter pancake section picking up another quarter unit of voltage making the total B circuit voltage now three quarters of a unit. The B circuit is then again strapped back via conductor 72 to the center of the pancake I where it traverses the last remaining quarter of the pancake picking up a fourth quarter unit of voltage. The total voltage on the B conductor now equals to one voltage unit thus matching the voltage of the A circuit conductor at the point where the two conductors leave pancake I and continue onto pancake II. In pancake II, the B circuit is also interleaved in a quadruple manner. However, in pancake II, the direction in which the pancake quarter sections of the B circuit traverse the pancake is reversed from pancake I to match the direction of the A circuit in pancake II. One may consider the B circuit in pancake II to be the mirror image of the B circuit in pancake I. It will be noted that the B circuit in FIG. 10B starts at a point somewhere inside of each pancake and then doubles back to another point in the same pancake. This is also true of conductors C and D in FIGS. 9A and 9B. For this reason, the voltage stresses as indicated between the parallel circuits in each pancake have fractional values.

Figure 11A:
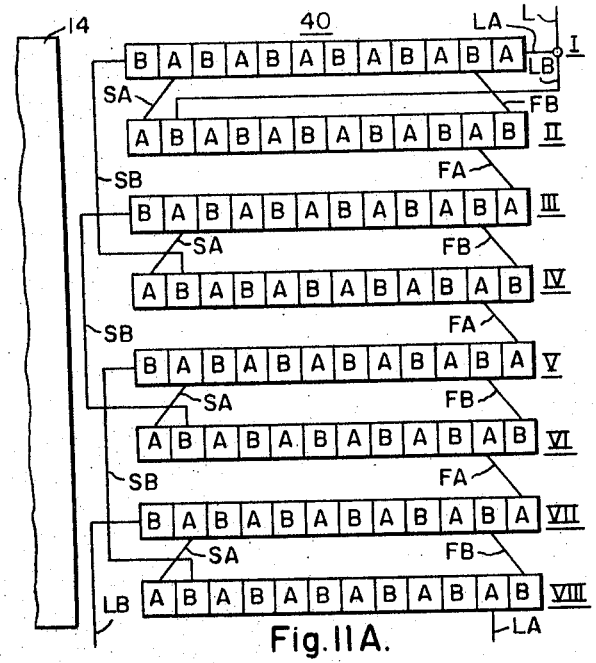
FIG. 11A is a transverse sectional view of a portion of a pancake winding embodying a modification of my invention.

In FIG. 11A of the drawings, there is illustrated a second embodiment of my invention 40 which uses a different mode of interconnection between pancakes to achieve the same results as the embodiment of the invention illustrated in FIGS. 1A and 1B. In the instant embodiment of the invention, a group of pancakes I–VIII are mounted about an adjacent inner winding 14. As in the previous embodiment of the invention, each pancake is wound with two electrically insulated conductors spiraled together into an open centered disk or pancake. Throughout the winding, one circuit is designated the A circuit and the other circuit is designated the B circuit. As in all embodiments of the invention, the A and B circuits alternate from turn to turn in each pancake. The connections between pancakes at the inner surface of the winding are so-called start-start connections and are generally designated SA for the A circuit and SB for the B circuit; the individual sections or pancakes are connected at the outer surface of the winding by so-called finish-finish connections, these connections are designated FB for the B circuit and FA for the A circuit. It will be noted in this embodiment of the invention that the SB connections are the only connections which pass over intermediate pancakes while making their connections; these connections are all located on the inner surface of the winding 40 near the adjacent inner winding 14. The A circuit line connections LA are made to the outside of the first pancake I and to the outside of the last pancake VIII. The B circuit line connections LB are made to the inside of the second pancake II and to the inside of the next to the last pancake VII from the bottom of the winding.

Figure 11B:
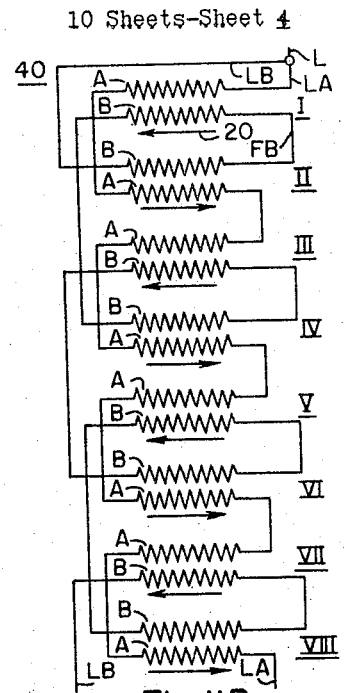
FIG. 11B is a schematic diagram of the modification of my invention illustrated in FIG. 11A.

Referring to FIG. 11B, there is illustrated a schematic diagram of the interleaved winding 40 of FIG. 2A. As in all embodiments of the invention, the arrow closest to each pancake such as arrow 20 near pancake I indicates the relative direction in which the respective circuits traverse each pancake. In all embodiments of the invention, the parallel circuits through the winding are transposed from pancake to pancake. For example, referring again to FIG. 11A, the A circuit in pancake I starts off at the outermost turn to the far right of the pancake. In the pancake II, the A circuit as one looks at the partial sectional view of the pancake from right to left, is first seen at the second turn from the outside of the pancake; a similar analysis holds for the B circuit. This transposition of circuits from pancake to pancake is represented in the schematic diagram of FIG. 11B at pancake I by showing the A circuit going through the upper strand of pancake I and through the lower strand of pancake II. The B circuit in these two pancakes is shown as the upper strand in pancake II and the lower strand in pancake I. Transposition of conductors which are connected in parallel is desirable to prevent circulating currents between conductors.

The A circuit traverses the winding from top to bottom through consecutive pancakes, changing direction from pancake to pancake. The A circuit is connected between pancakes by alternate start-start and finish-finish connections.

The B circuit traverses the winding from top to bottom by means of consecutive pairs of pancakes, such as pancake pairs I, II and III, IV. The B circuit goes first through the second pancake of each pair of pancakes, then through the first pancake of each pair. The B circuit then goes to the next pair of pancakes where the same connections are made. The connection between successive pairs of pancakes in the B circuit is a start-start connection such as SB; the connection between the pancakes of a given pair in the B circuit is a finish-finish connection such as FB. The embodiment of my invention is not as desirable as the embodiment illustrated in FIGS. 1A and 1B because of the connections SB on the inside of the winding, but it is one way my invention may be practiced.

One may see from FIG. 12 that the principle of interleaving a plurality of parallel conductors is not limited to pancake windings. A layer wound or so-called cylindrical winding 80 is provided embodying the principles of my invention. The layer wound winding 80 wound over a winding 14 may be any type of transformer winding. The winding 80 is adapted for high currents and is built up with a plurality of conductor layers I through VI. A layer of electrical insulation may be used between the conductor layers such as the electrical insulation 82 between the conductor layers V and VI. As in previously described embodiments of my invention, I have designated two circuits as an A circuit and a B circuit. It will be observed that the turns of each circuit are numbered consecutively from their starting points near winding 14 to their finishing turns near the top of the figure. The winding starts at the conductor LS which is the line start conductor and finishes at conductor LF which is the line finish conductor. The LS conductor is divided into the A circuit line start conductor LAS and the B circuit line start conductor LBS. The LAS conductor enters the winding at turn A0 of layer I. The A circuit then continues through layer I by means of adjacent turns to conductor A12 on the extreme left of layer I. The A circuit is then strapped or connected to layer II at a turn which is also designated A12 because it is at the same electrical potential as turn A12 in layer I. In layer II, the A circuit traverses the layer in the opposite direction from which it traversed layer I. The A circuit goes through the rest of the layers in the same manner, reversing direction from layer to layer, until it reaches turn A72 of pancake VI. The A circuit is then brought out of the winding by conductor LAF which is the line finish connection between the A circuit and the line. The line finish conductor is represented by conductor LF. The B circuit utilizes the companion conductor to the A circuit in each layer. It will be understood that the A and B conductors in each layer may be wound together and then have appropriate connections made between the end turns of each layer. The B circuit enters the winding at the extreme left of layer II. The B circuit then goes through layer II in the same manner as the companion A circuit to turn B12. Turn B12 is connected to a turn of layer I which is also designated B12. The B circuit then travels across the layer I to turn B24 where it is strapped to the left-hand side of layer IV. The B circuit goes through the layer IV and then the layer III in the same manner as previously described with reference to layers II and I. In general, it will be observed that the B circuit after going through a given layer drops back and goes through a preceding layer in the opposite direction. The A circuit then repeats this sequence with the next pair of layers in the winding. B circuit continues through the winding in this way until the last pair of layers VI and V have been traversed. The last turn in this pair of layers is turn B72. Turn B72 is connected to the line finish conductor LF by means of the B circuit line finish conductor LBF. It will be understood from an examination of the layers I to VI that the A and B circuits pass current in the same direction in the same layer. One may consider the layers in this embodiment of my invention as being equivalent to the pancakes in the other embodiments of my invention. In the pancakes, the turns of individual circuits are separated by other turns in the same plane; in the layer construction illustrated, the turns of the individual circuits are adjacent to one another and are separated from the other circuit by being in a different plane.

It will, therefore, be apparent that there has been disclosed, in several embodiments, an interleaved pancake winding which has a high series capacitance and high current carrying capacity. In each embodiment of the invention, a plurality of circuits are used in each pancake and the voltage stress between circuits is the same in each pancake. A mode of interconnection of winding sections is taught which can be used to eliminate start-start connections which cross intervening sections. Most connections between pancakes are either of the start-start or finish-finish variety.

The invention may be adapted to any number of conductors and still employ the connections between pancakes I have disclosed for high current and high series capacitance. Since numerous changes may be made in the above-described apparatus, and different embodiments may be made without departing from the spirit thereof, it is intended that all the matter contained in the foregoing description or shown in the accompanying drawings shall be interpreted as illustrative and not in a limiting sense.

I claim as my invention:

1. An interleaved winding for electrical inductive apparatus comprising:
   a plurality of pancake coils,
   each of said pancake coils including at least one turn group, each of said turn groups including at least first and second insulated electrically conductive strands spirally wound together to provide a plurality of radially disposed turns,
   means connecting the first conductive strands of each turn group in series circuit relation with one another, to provide a first series path through the winding having first and second ends,
   the second conductive strand of each of said turn groups being severed at substantially its midpoint to provide first and second radial sections in each turn group which have adjacent ends and opposite ends,
   means connecting the opposite ends of the first and second radial sections together in each of said turn groups,
   and means interconnecting predetermined inner ends of the first and second radial sections of each turn group with predetermined inner ends of the first and and second radial sections of other turn groups to provide a second series path through the winding having first and second ends in which the direction of current flow is always the same as in the first series path it is interleaved with,
   each of said pancake coils being completed before said first and second conductive strands proceed to and adjacent pancake coil, said first and second series paths proceeding through said plurality of pancake coils in sequence,
   at least the first and seconds ends of said first and second series paths being connected together, respectively.

2. The interleaved winding of claim 1 in which each pancake coil includes only one turn group and each turn group includes only said first and second conductive strands.

3. The interleaved winding of claim 1 wherein each turn group includes third and fourth insulated conductive strands radially interleaved with said first and second insulated conductive strands, said third and fourth conductive strands being electrically connected in the same manner as same first and second conductive strands, respectively, forming third and fourth series paths through the winding each having first and second ends, the first and second ends of said first, second, third, and fourth series paths being connected together, respectively.

4. The interleaved winding of claim 1 wherein each pancake coil includes at least two turn groups.

(References on following page)

References Cited by the Examiner

FOREIGN PATENTS

| | | |
|---|---|---|
| 1,222,757 | 1/1960 | France. |
| 1,244,867 | 9/1960 | France. |
| 95,798 | 1/1961 | Netherlands. |

OTHER REFERENCES

Smit et al., German application No. 1,082,342, pub. May 25, 1960.

LARAMIE E. ASKIN, *Primary Examiner.*

T. J. KOZMA, *Assistant Examiner.*